United States Patent [19]

Kim

[11] Patent Number: 5,457,618
[45] Date of Patent: Oct. 10, 1995

[54] REAR COMBINATION LAMP BULB BODY FIXING STRUCTURE

[75] Inventor: Jung K. Kim, Woolsan, Rep. of Korea

[73] Assignee: Hyundai Motor Company, Seoul, Rep. of Korea

[21] Appl. No.: 100,179

[22] Filed: Aug. 2, 1993

[51] Int. Cl.⁶ .............................. F21V 19/04; F21V 21/08
[52] U.S. Cl. .................. 362/382; 362/226; 362/396
[58] Field of Search .................. 362/226, 80, 285, 362/364, 365, 368, 369, 382, 396, 83.3

[56] References Cited

U.S. PATENT DOCUMENTS

| | | | |
|---|---|---|---|
| 3,280,323 | 10/1966 | Pawlowski | 362/369 |
| 4,176,391 | 11/1979 | Kulik et al. | 362/369 |
| 4,326,243 | 4/1982 | Pistor et al. | |
| 4,488,206 | 12/1984 | Mizusawa. | |
| 4,532,578 | 7/1985 | Gaden et al. | |
| 4,725,929 | 2/1988 | Huang | 362/80 |

*Primary Examiner*—Ira S. Lazarus
*Assistant Examiner*—Y. Quach
*Attorney, Agent, or Firm*—Birch, Stewart, Kolasch & Birch

[57] ABSTRACT

The present invention relates to a structure designed to fix a bulb body in a rear combination lamp housing. A rectangular opening 3 is formed in the lamp housing and two catching grooves are formed on one side of the opening. A catching plate provided with a catching slot 7 at one end is formed in the rear of a bulb body and a tension clip with catching jaws formed perpendicular to the catching plate is integrated with the other end of the catching plate. With the catching slot 7 caught at one end of the opening and with the jaws elastically caught in the catching grooves, the bulb body is fixed in the housing. When the arms of the tension clip are compressed in a narrowed manner, the bulb body is separated from the housing.

9 Claims, 3 Drawing Sheets

REAR COMBINATION LAMP BULB BODY FIXING STRUCTURE

BACKGROUND OF THE INVENTION

1. Field of the Invention

The present invention relates to a rear combination lamp of an automobile. More particularly, the invention relates to a fixing structure designed to secure a bulb body into which a bulb is inserted in a housing in the backside of the rear combination lamp.

2. Description of Related Art

The rear combination lamp bulb body fixing structure heretofore in general use includes a catching plate with a catching slot formed at the lower end and integrated with the rear end of a bulb body to which a lamp is fixed An opening into which a bulb is inserted is formed in a lamp housing in which the bulb body is fixed but a catching tension clip is integrated with the upper part of the opening and the upper end of the bulb body catching plate is caught in the opening of the rear combination lamp housing. In other words, the bulb body is inserted and fixed in the rear combination lamp housing by forming the tension clip as part of the lamp housing.

Accordingly, when the bulb body is united with the housing in such a fixing structure, the catching concave of catching plate is hung up on the housing and the catching plate is pushed toward the housing.

However, when the bulb body is separated from the housing, the catching tension clips must be opened one by one, and so it is troublesome to replace the bulbs. In the case where the catching tension clip is less elastic or opened excessively, it is damaged occasionally. In this case, the expensive housing cannot be replaced so often that the bulb body is fixed by use of a supplementary means such as an adhesive tape.

SUMMARY OF THE INVENTION

The present invention is to provide a rear combination lamp bulb body fixing structure designed to solve such a conventional problem as stated hereinabove.

Such an object of the present invention can be accomplished when an opening for insertion of a bulb is formed in the rear combination lamp housing but two grooves are formed on one side of said opening, and a catching slot is formed in the lower part on one side of a bulb body and a catching plate with a tension clip integrated therewith is provided on the opposite side of the bulb body.

The present invention will now be described in detail by referring to the drawings attached hereto.

DETAILED DESCRIPTION OF THE PREFERRED EMBODIMENTS

Figure 1:
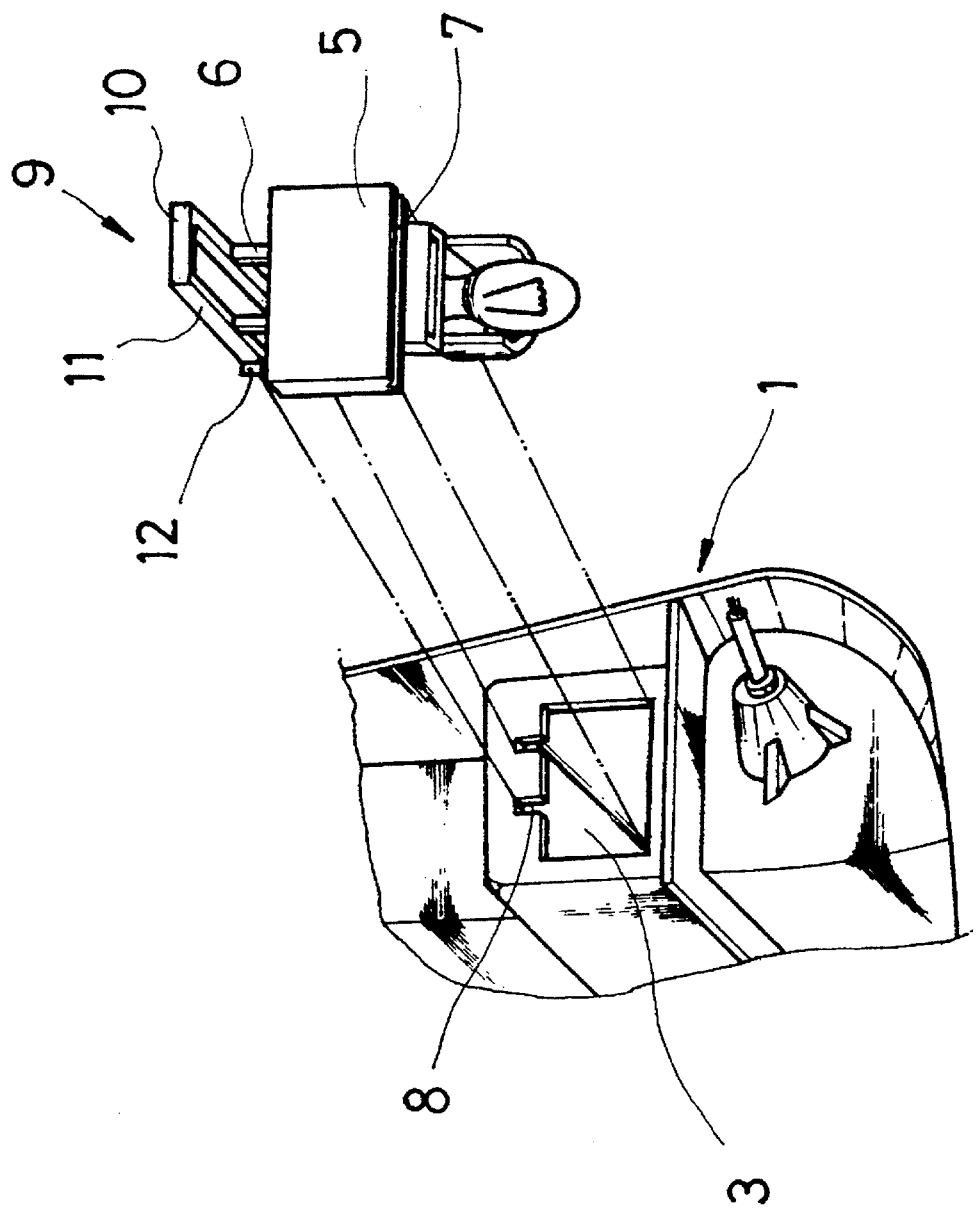
FIG. 1 is a perspective view illustrating a bulb body separated from a rear combination lamp housing according to the present invention.
Figure 2:
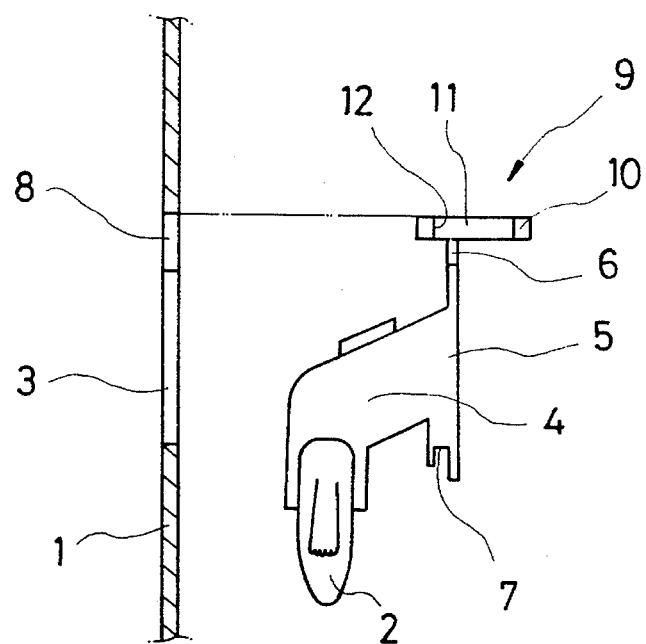
FIG. 2 is a rough cross-sectional view of FIG. 1 showing the separated condition of a fixing structure according to the present invention.

Regarding the rear combination lamp bulb body fixing structure according to the present invention as illustrated in FIGS. 1 and 2, two catching grooves 8 are formed left and right in an upper part of an opening 3 and a tension clip 9 is formed at an upper end as shown in FIG. 1 catching plate 5 formed on a bulb body 4. The tension clip is inserted in grooves 8 in the rear combination lamp bulb body fixing structure which comprises a rear combination lamp housing 1 where the opening 3 into which a bulb is inserted is formed and the bulb body 4 bulb 2 is inserted in front of the bulb body 4, and the catching plate 5 with a catching slot 7 formed therein is formed at the rear of the bulb body.

Giving a detailed explanation of the tension clip 9, two long arms 11 are formed perpendicularly on two left and right connecting bars 6 extending to the upper end of the bulb body catching plate 5 formed on the bulb body 4 and a pair of catching jaws 12 are formed at inner ends respectively, of the two long arms 11 so as to be caught in the catching grooves 8 formed in the rear combination lamp housing 1 and other ends thereof are connected to each other by forming pressing part 10.

Figure 3:
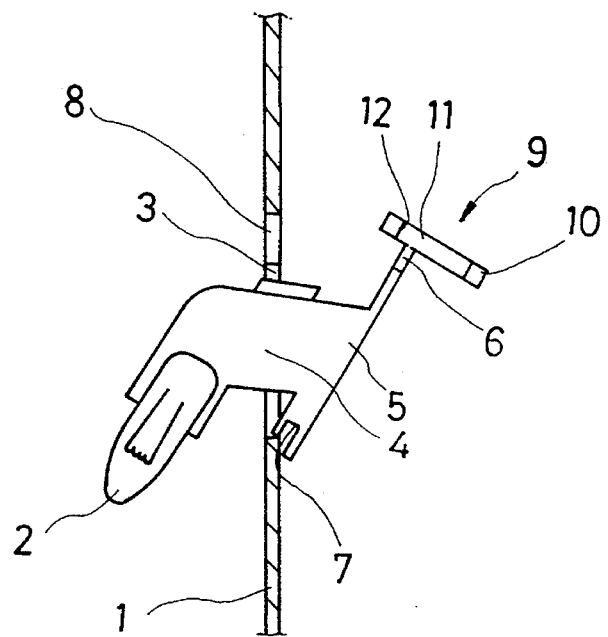
FIG. 3 is a rough cross-sectional view of FIG. 1 showing the uniting process of a fixing structure according to the present invention.
Figure 4:
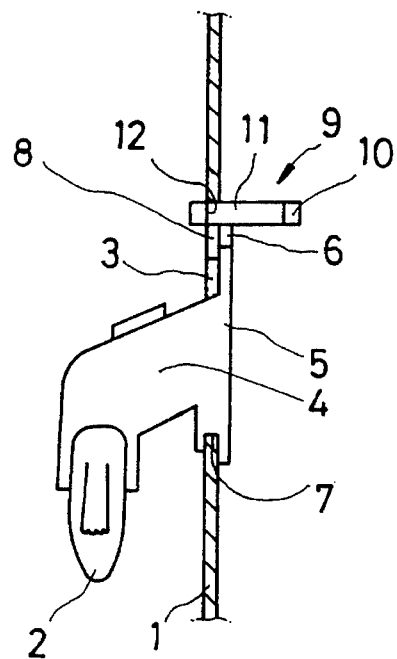
FIG. 4 is a rough cross-sectional view of FIG. 1 showing the united condition of a fixing structure according to the present invention.
Figure 5:
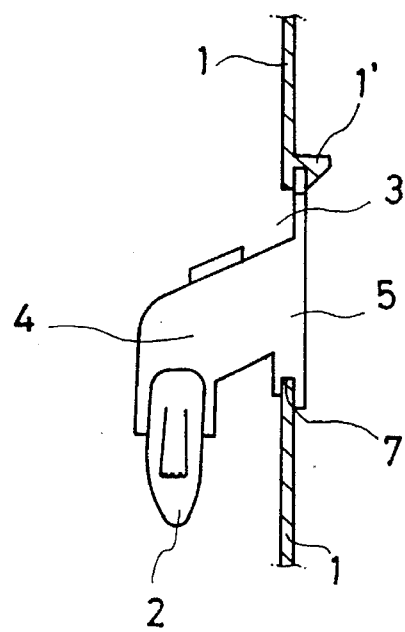
FIG. 5 is a rough cross-sectional view showing the fixed condition of a bulb body in a conventional rear combination lamp housing.

Now, combination and separation of bulb body 4 according to the present invention will be described by referring to FIGS. 3 and 4.

Taking hold of the catching plate 5 in the rear of the bulb body 4 in which the bulb 2 is inserted, hang the catching slot 7 on the lower end of the opening 3 of lamp housing 1 in a condition where the bulb 2 is inserted in the opening 3 of said lamp housing 1, and set the catching jaws 12 of the tension clip 9 in the grooves 8 formed in the upper part of the opening 3 and push the pressing part 10 lightly. Then, both arms 11 become narrower and the catching jaws 12 are thereby pushed into the respective catching grooves 8 and the catching plate 5 is firmly fixed to the lamp housing 1 on the side of the catching grooves 8. At the same time, both arms 11 return to the original state by means of elasticity and the catching jaws 12 are thereby caught in the inner wall of lamp housing 1. At this time, a backside of the tension clip 9 is kept projecting to the outside of lamp housing 1.

In order to separate the bulb body 4 from the lamp housing 1 to replace the bulb 2 in such a condition, the arms 11 of tension clip 9 projecting to the outside of lamp housing 1 are compressed and the catching jaws 12 are then released from the side walls of both grooves 8 in the lamp housing 1. Upon lightly pulling the tension clip 9, the bulb body 4 will be separated from the lamp housing 1.

As described hereinabove, when the tension clip 9 is pushed by inserting the catching jaws 12 of the tension clip 9 formed on one side of the bulb body 4 into the catching grooves 8 of the lamp housing 1, the bulb body 4 is united with the lamp housing 1 and when the tension clip 9 is pulled by compressing the arms 11 on both sides of tension clip 9, the bulb body 4 is separated from the lamp housing. Operation including insertion and removal of the bulb body into and from the lamp housing is, therefore, simple.

Accordingly, bulb replacement is easy and a location at which the bulb body is united with the lamp housing is free from being damaged. Because assembly is easy, operation efficiency is improved.

What is claimed is:

1. A rear combination lamp and mounting assembly comprising:

a rear combination lamp housing, said housing including an opening formed in one wall thereof and a pair of notched catching grooves provided at one side of the opening within the wall of said housing; and a lamp body having a bulb integrally connected thereto, said lamp body including a catching plate joinable with the wall of said housing, the catching plate having a catching slot formed at one end thereof and a tension clip formed at an opposing end thereof from the catching slot;

said tension clip including a pair of parallel elongated tension arms oriented transverse to a planar surface of the wall of said housing, a pair of catching jaws formed at first ends of the pair of tension arms, respectively, a compression member formed at second ends of the pair of tension arms and elastically connecting the second ends of the pair of tension arms together, and pair of connecting bars for connecting the pair of tension arms to the catching plate, respectively, wherein the bulb of said lamp body is removably inserted into the opening of said housing such that the catching slot seats on a portion of the wall opposing the pair of catching grooves and the pair of catching jaws elastically fit within the corresponding pair of catching grooves.

2. The rear combination lamp and mounting assembly according to claim 1, wherein the pair of connecting bars are positioned at substantially a mid-point of the pair of tension arms such that upon elastic insertion of the pair of catching jaws into the corresponding pair of catching grooves, the pair of tension bars will be inserted into said housing until the pair of connecting arms contacted with the wall of said housing.

3. The rear combination lamp and mounting assembly according to claim 1, wherein upon elastic compression of the compression member, the pair of catching jaws are compressed together for insertion into and removal from the pair of catching grooves.

4. The rear combination lamp and mounting assembly according to claim 1, wherein the pair of catching jaws are normally spaced farther apart than the corresponding pair of catching grooves, such that upon elastic compression of the compression member, the pair of catching jaws are compressed together for insertion into and removal from the pair of catching grooves.

5. The rear combination lamp and mounting assembly according to claim 1, wherein said lamp body bulb and tension clip are of a one-piece construction.

6. The rear combination lamp and mounting assembly according to claim 1, wherein the catching plate of said lamp body and the opening in said housing are of a similar shape such that upon facing of the catching plate against said housing, the opening is completely covered by the catching plate.

7. The rear combination lamp and mounting assembly according to claim 6, wherein the catching plate and the opening are each rectangular in shape.

8. The rear combination lamp and mounting assembly according to claim 1, wherein the pair of tension arms and the compression member are formed of a one-piece construction of an elastic material.

9. The rear combination lamp and mounting assembly according to claim 1, wherein each one of the pair of catching jaws are formed to extend perpendicularly from corresponding ones of the pair of tension arms.

* * * * *